April 21, 1959   M. SMOLENSKY   2,882,925
CHECK VALVE STRUCTURE
Filed Nov. 22, 1954

INVENTOR.
MICHAEL SMOLENSKY
BY Golrick & Golrick
ATTORNEYS

United States Patent Office 2,882,925
Patented Apr. 21, 1959

2,882,925
CHECK VALVE STRUCTURE

Michael Smolensky, Cleveland Heights, Ohio

Application November 22, 1954, Serial No. 470,349

1 Claim. (Cl. 137—542)

This invention is directed to novel improvements in check valves and particularly check valves for use in fluid lines of comparative large pressure capacity and the general object is the provision of a check valve mechanism sensitive to pressure variations and silent in operation.

In fulfilling the general purposes of the invention I utilize a construction which can be manufactured economically but with sufficient precision of parts to insure a sensitive response to pressure variation.

More specifically the object of the present invention is the provision of a simplified poppet or plug valve structure which will retain its sensitivity to pressure variations regardless of a horizontal or vertical or any intermediate position of the valve mechanism.

Other objects include the provision of a valve structure of the type above referred to wherein the valving surfaces may comprise a tough metal such as stainless steel or monel metal in the form of liners whereby the same may be replaced upon servicing of the valve.

Other objects of the invention will become apparent from the following description referring to the accompanying drawings showing a preferred embodiment of the invention. The essential characteristics of the invention are summarized in the claim.

Figure 1:
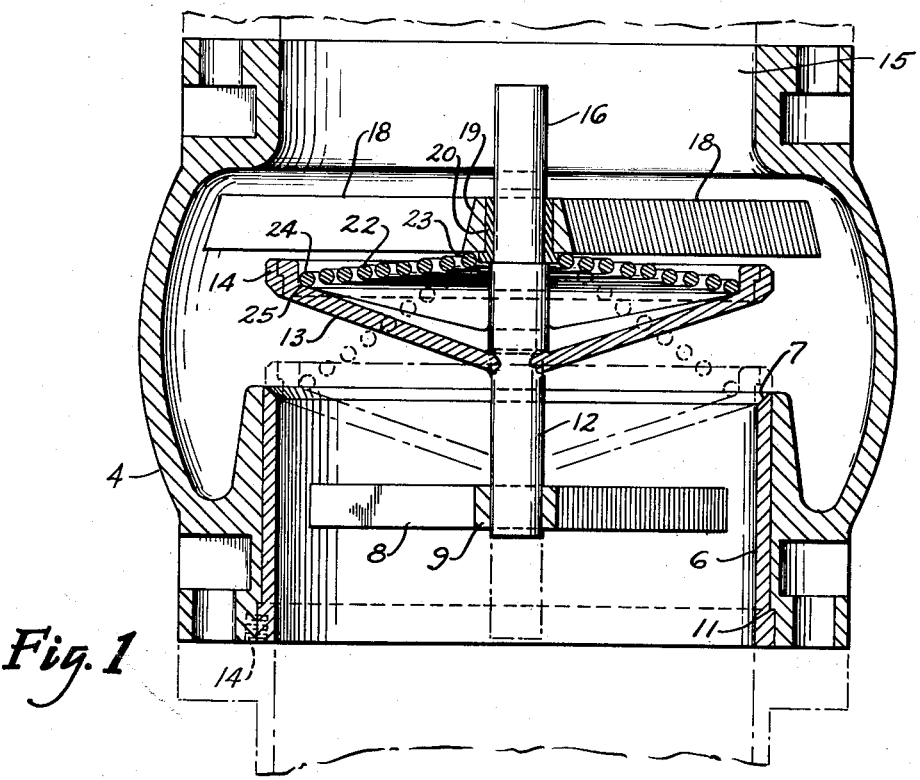
Figure 2:
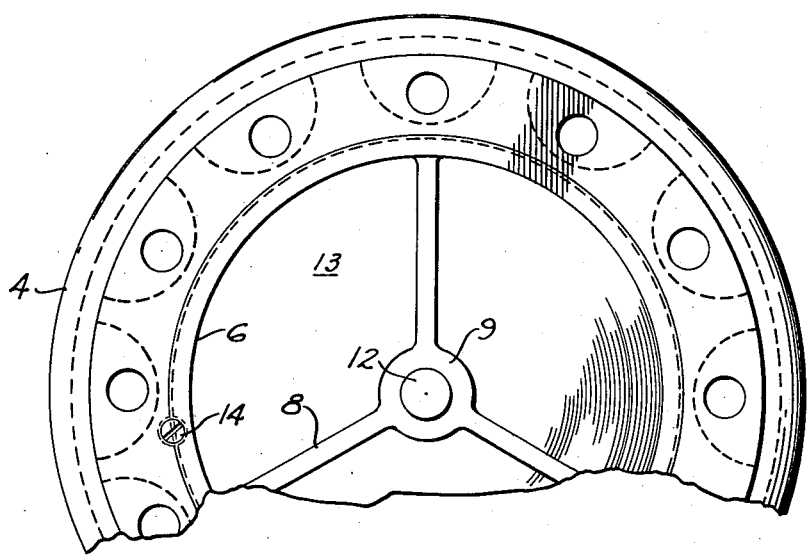

In the drawings, Fig. 1 is a central axial cross sectional view of a valve mechanism incorporating the features of my invention; and Fig. 2 is a fragmentary upstream end view of the valve structure shown in Fig. 1.

The present invention contemplates improvements in the valve mechanism shown in my U.S. Patent 1,950,575 wherein I disclose a valve mechanism having the same general utility as my present valve mechanism. In that mechanism I show an internally housed concentric arrangement of two helical springs with a cluster of auxiliary valves carried by the main valve and each being seated by a spring. One of the improvements contemplated is to eliminate the eight springs there shown to one spring constructed and arranged to act on a single valve plug in such manner as to obtain the desired sensitive response to pressure variations from one side to the opposite side of the valve plug.

Referring to the drawings I show a valve body 4 having a semi-global shape to afford a throat structure for assuring a scavenging flow of the fluid past the valve seating surfaces and wherein the elements carrying the seating surfaces are constructed and incorporated to be replaceable. Thus I show a valve seat sleeve 6 having a seat formation 7 at its inner annular end. The sleeve member 6 is cast of stainless steel, bronze or other durable metal with a three armed spider construction 7 supporting a central bearing 9. This sleeve 6 is precision fitted into the inlet opening of the valve body and is held in position by keying lock screw 10 against a shoulder 11 formed in the inlet bore of the valve body.

The bearing portion 9 is bored and reamed to receive a valve stem 12 of a coniform valve formation 13. This valve member carries a valve seating ring 14 which may be fitted upon the perimeter of the coniform structure by press fitting or shrinking. The diameter of the ring 14 is less than the diameter of the inlet bore of the valve body. The valve stem 12 has an upper extension 16 which is slidably supported by an upper spider structure 18 and bearing center 19 located in the body throat below the outlet opening 15. A durable bearing sleeve 20 formed of a bearing metal such as stainless steel is centrally supported by the upper spider structure. The spider structure is formed within the upper reach of the throat structure of the valve body and precision of alignment of the two bearings for the stem 12—16 is obtained by aligning the fixture with the bored inlet of the valve body.

The coniform valve member 13 is maintained in a downward seated position on the seat 7 by a conically wound spring 22 having its apex coil 23 seated against the upper spider structure 18 of the valve body and centered by the flange of the bearing sleeve 20 and its lower outer coil 24 bearing on a seat 25 formed on the upper face of the coniform valve member adjacent its valve seat or ring 14 whereby the spring thrust is exerted upon the valve member adjacent to the valve seating surfaces when the valve is closed.

I find the valve arrangement described to be sufficiently sensitive to obtain the desired checking action even where the prevailing line pressure is relatively low without any resulting chattering or vibration of the valve member.

Should any wire drawing take place at the co-operating seats the mechanism can be serviced by withdrawing the sleeve 6 and since the diameter of the coniform valve member seating ring 14 is of less diameter than the inlet bore of the valve body both valve seating surfaces can be removed from the valve body.

I claim:

In a check valve mechanism comprising a hollow globe type valve body having aligned inlet and outlet openings, an inlet cylinder in the inlet opening having a valve seat on its upper end and having a centrally located web supported valve stem bearing hub, an integrally formed web supported valve stem bearing hub located within the body immediately adjacent the outlet opening, a flanged valve stem bearing sleeve having the flange thereof of less diameter than the last named hub and located on the underside thereof with the bearing sleeve flange in abutment with the underside of the hub, a valve stem mounted in the hubs of the said webs, a coniform valve structure formed on the stem having an apex thereof extending toward the inlet opening of the valve body, said valve structure having a valve face supporting flange extending toward the outlet opening of the body, a valve face surrounding said supporting flange for co-operation with said valve seat, an annular spring seat formed on the inside of the coniform valve structure adjacent the valve face supporting flange and a coniform spring having the base thereof reacting at the bottom thereof on the annular spring seat and the top of the spring in centralized contact with the perimeter of the flange of said valve bearing sleeve and the underside of the second said valve stem bearing hub whereby the top of the spring is maintained out of contact with the valve stem.

References Cited in the file of this patent

UNITED STATES PATENTS

| 442,284 | Craig | Dec. 9, 1890 |
| 526,975 | LaFrance | Oct. 2, 1894 |
| 822,983 | Rhoda | June 12, 1906 |
| 1,573,520 | McNab | Feb. 16, 1926 |
| 2,102,289 | Smolensky | Dec. 14, 1937 |
| 2,301,276 | Gussick | Nov. 10, 1942 |
| 2,356,360 | Smolensky | Aug. 22, 1944 |
| 2,744,727 | Osburn | May 8, 1956 |

FOREIGN PATENTS

| 332,036 | Germany | Jan. 20, 1921 |